H. L. WASHBURN.
UNIVERSAL JOINT.
APPLICATION FILED MAY 28, 1919.
1,346,776.
Patented July 13, 1920.
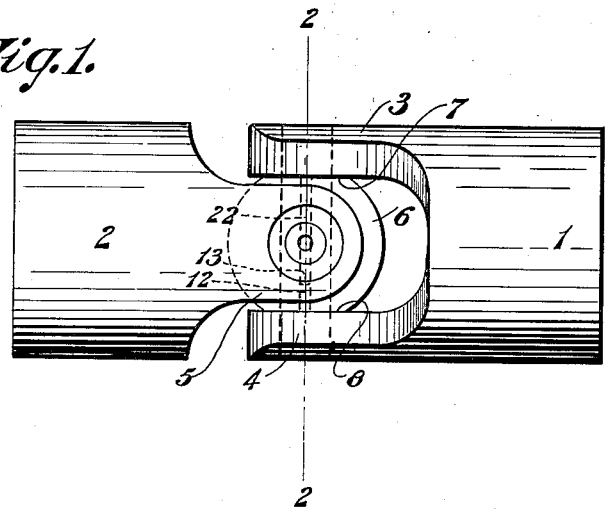
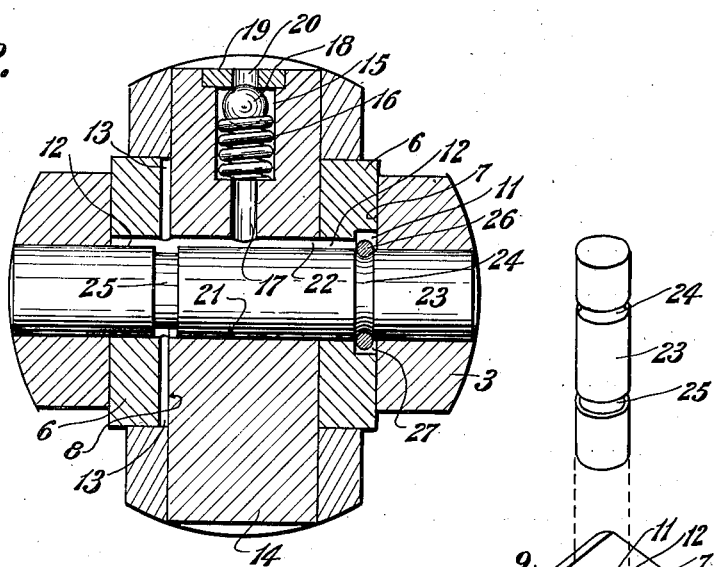
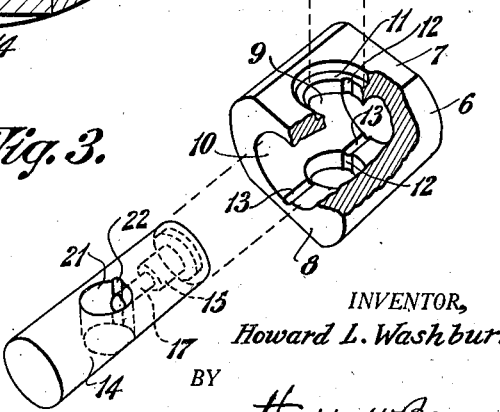
WITNESS:
B. F. Cleaver.
INVENTOR,
Howard L. Washburn,
BY
Harry W. Bowen.
ATTORNEY.

UNITED STATES PATENT OFFICE.

HOWARD L. WASHBURN, OF SPRINGFIELD, MASSACHUSETTS, ASSIGNOR TO CHARLES S. BALLARD, ASSIGNEE OF THE AMERICAN TELEGRAPHONE COMPANY, OF SPRINGFIELD, MASSACHUSETTS, A CORPORATION OF THE DISTRICT OF COLUMBIA.

UNIVERSAL JOINT.

1,346,776.

Specification of Letters Patent.   Patented July 13, 1920.

Application filed May 28, 1919. Serial No. 300,439.

*To all whom it may concern:*

Be it known that I, HOWARD L. WASHBURN, a citizen of the United States of America, residing in Springfield, in the county of Hampden and Commonwealth of Massachusetts, have invented certain new and useful Improvements in Universal Joints, of which the following is a specification.

This invention relates to improvements in the construction of universal joints of the type in which a solid block is located between the ends of the oppositely extending arm members or forks of the adjacent connecting shafts and pins passed through the block at right angles to each other and having a running fit bearing in openings in the oppositely located forks or arms. An object of the invention is to provide a universal joint structure of this type in which means are provided for thoroughly lubricating all of the joint or movable surfaces.

Broadly, the invention resides in the provision of oil passages, which passages are located in the openings of the block and also in the border of one of the connecting pins, the other connecting pin being formed with annular grooves for permitting the oil to flow freely around the same and then travel along the grooves in the block and in the groove of the other pin, the first mentioned pin being formed with an entrance opening for inserting the oil, and suitable means for closing the entrance.

Referring to the drawings;

Figure 1 is a plan view of a joint showing the end of one of the pins and the opening therein for the insertion of the oil, also in dotted lines the oil grooves or passage-ways at right angles to each other, these grooves being formed in the block at right angles to each other.

Fig. 2 is a transverse sectional view on the line 2—2 of Fig. 1, showing the oil passage-ways, the groove in one of the pins and the annular grooves in the pin at right angles thereto, also showing the spring ring for securing one of the pins in the block.

Fig. 3 is a perspective view showing a portion of the block broken away to illustrate the openings therethrough at right angles to each other and the oil grooves and these openings, also showing the two pins spaced away from the block as indicating the direction in which they are moved when the parts are separated.

Referring to the drawings in detail: 1 and 2 indicate the oppositely located adjacent ends to which the shafts are connected. These ends are formed with the oppositely located arms or projections 3 and 4 of the member 1 and 5 of the member 2, the other one being hidden from view as it is on the opposite side of the figure. 6 designates a block of solid material that is located between the projections of the parts 1 and 2, a sectional detail view of which is shown in Fig. 3. This block is formed with the oppositely located parallel faces 7 and 8, which surfaces are bearing surfaces that engage the inner surfaces of the projections 3, 4 and 5. Extending through the block are two openings 9 and 10 at right angles to each other, the opening 9 being formed with a shoulder recessed portion 11. The border of this opening is formed with a groove 12. The opening 10, which extends at right angles to the opening 9 is also formed with a groove 13. The pin 14 shown in large view in Fig. 2 and perspective view in Fig. 3 is formed with a recess 15 at one end for receiving the spring 16. Located below the recess is a passage-way 17. Located on the outer end of the spring 16 is a ball 18. This ball is held in place by means of the plate 19 having an oil opening 20. Extending through the pin 14 is an opening 21 midway of its length and formed in the border of the opening is an oil groove 22, which groove communicates with the opening 17 as shown in Fig. 2. 23 designates a pin which passes through the opening 21 of the pin 14. This pin is formed with two annular grooves 24 and 25. The groove 24 is for the purpose of retaining the pin 23 in place in the block by means of the spring ring 26, which ring is snapped into the annular recess 27 of the block 6. The annular groove 25 registers with the groove 13 of the block 6. The parts are assembled as follows: The block 6 is placed between the members 1 and 2. The pin 14 is passed through the usual openings in the ends of the arms with a running fit and driven into the block 6 with a driving fit. The pin 23 is then passed through the openings in the other pair of arms 3 and 4 and through the opening 21 of the pin 14, it being understood that this pin has a driving fit in the block 6, and is held in place by means of the spring ring 26. This pin may be readily removed by light blows on the end in order to disengage the spring ring. When the oil is inserted through the opening 20 it flows past the oil retaining ball 18 through the opening 17 into the groove 22 and follows along this grove in opposite directions from the opening 17 until it comes to the annular grooves 24 and 25 of the pin 23, then flows around the grooves and along or onto the bearing surfaces 7 and 8 of the block and lubricates these surfaces and also the ends of the pin 23 in the openings in the arms 3 and 4. The oil also flows around the annular grooves 24 and 25 and along the groove 13, and lubricates the ends of the pin 14. It will therefore be seen that all of the wearing surfaces are freely lubricated.

What I claim is:

1. In a universal joint structure, the combination with the adjacent forked ends, of a block located between the ends and having openings each of which is of uniform bore therethrough, pins in the openings and having a running fit in the openings in the forked ends, and means for lubricating the bearing surfaces of the joint comprising communicating grooves in the block and one of the pins.

2. In a universal joint structure, the combination with the adjacent forked ends having pin receiving openings therein, a block having openings therethrough, two pins in the openings of the block and entering the openings in the ends, the openings in the block having grooves in their borders, one pin having an opening therethrough to receive the other pin, and a groove in the border of its opening, said pin having annular grooves communicating with all of said grooves, whereby all of the surfaces of the block, and pins are lubricated.

3. In a universal joint structure the combination with the adjacent forked ends, of a block between the ends, said block having oil passages therein, pins passing through the block, and having grooves communicating with the oil passageways, one of the pins having an opening in its end which communicates with the passageways, and means for locking the pins in the block comprising an annular groove in the block, a groove on a pin and a spring ring engaging the grooves.

4. A universal joint structure comprising in combination with oppositely disposed members having forked ends, of a block, formed with openings therethrough, pins in the openings, oil grooves in the openings of the block, one of the pins having annular passageways communicating with the oil grooves for distributing the oil to the ends of the same and also to the bearing surfaces between the block and one set of forked ends.

5. A universal joint structure comprising in combination with oppositely disposed members having forked ends, of a block, formed with openings therethrough, pins in the openings, oil grooves in the openings of the block, one of the pins having annular passageways communicating with the oil grooves for distributing the oil to the ends of the same and also to the bearing surfaces between the block and one set of forked ends, the other pin having an opening therethrough to register with one of the openings in the block to receive said annular grooved pin, and a spring ring engaging the block and grooved pin for locking the pins in the block.

HOWARD L. WASHBURN.